United States Patent
Cranston et al.

(10) Patent No.: US 7,757,957 B2
(45) Date of Patent: Jul. 20, 2010

(54) TEXTURED TRANSACTION CARDS AND METHODS OF MAKING THE SAME

(75) Inventors: Kimberly A. Cranston, Ossining, NY (US); Michele D. Logan, Madison, NJ (US); Lisa E. Skilling-Belmond, New York, NY (US); Lisa A. Webb, Darien, CT (US); John J. Wenger, Wallingford, PA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/201,844

(22) Filed: Aug. 11, 2005

(65) Prior Publication Data

US 2006/0255155 A1 Nov. 16, 2006

(51) Int. Cl.
*G06K 19/02* (2006.01)

(52) U.S. Cl. .................................. 235/488; 235/487

(58) Field of Classification Search ................ 235/488, 235/380, 487
See application file for complete search history.

(56) References Cited

U.S. PATENT DOCUMENTS

| | | | |
|---|---|---|---|
| 4,506,915 A | 3/1985 | Haghiri-Tehrani et al. | |
| 5,261,987 A * | 11/1993 | Luening et al. | 156/235 |
| 5,266,781 A * | 11/1993 | Warwick et al. | 235/375 |
| 5,526,664 A | 6/1996 | Vetter et al. | |
| 5,883,377 A | 3/1999 | Chapin, Jr. et al. | |
| 6,158,663 A | 12/2000 | Ochiai et al. | |
| 6,214,155 B1 * | 4/2001 | Leighton | 156/298 |
| 7,134,603 B2 * | 11/2006 | Batoha | 235/491 |
| 2002/0007906 A1 * | 1/2002 | Droz | 156/269 |
| 2002/0092914 A1 * | 7/2002 | Pentz et al. | 235/487 |
| 2002/0096569 A1 * | 7/2002 | Boutaghou et al. | 235/493 |
| 2003/0065938 A1 * | 4/2003 | Kitamura et al. | 713/200 |
| 2003/0223616 A1 * | 12/2003 | D'Amato et al. | 382/100 |

FOREIGN PATENT DOCUMENTS

| | | |
|---|---|---|
| DE | 295 12 254 | 11/1995 |
| DE | 197 20 793 | 11/1998 |
| EP | 0 793 187 | 9/1997 |
| EP | 0 834 361 | 4/1998 |
| GB | 1 263 556 | 2/1972 |
| GB | 1 576 168 | 10/1980 |
| GB | 2 403 182 | 12/2004 |

OTHER PUBLICATIONS

International Search Report for PCT/US2006/018308 dated Oct. 4, 2006.

* cited by examiner

*Primary Examiner*—Daniel A Hess
(74) *Attorney, Agent, or Firm*—Snell & Wilmer L.L.P.

(57) ABSTRACT

Rigid polymeric transaction cards are provided having a plurality of layers forming a first surface and a second surface wherein at least one of said first and second surfaces comprises a textured pattern. In addition, a method of making a transaction card is provided wherein a textured pattern is disposed into a lamination plate, and further wherein a plurality of layers are laminated together to form a rigid card having the textured pattern disposed in at least one of the first and second surfaces of the transaction card.

19 Claims, 3 Drawing Sheets

TEXTURED TRANSACTION CARDS AND METHODS OF MAKING THE SAME

FIELD OF THE INVENTION

The present invention relates to transaction cards, usable in financial transactions, and having distinctive features relating to their tactile and visual properties of at least one surface of the transaction card.

BACKGROUND

The proliferation of transaction cards, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tampering. Thus, the cards served as devices to provide data to merchants and the security associated with the card was the comparison of the cardholder's signature on the card to the cardholder's signature on a receipt along with the embossed cardholder's name on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards include not only demographic and account information, but the transaction cards also include graphic images, designs, photographs and security features. A relatively recent security feature is the incorporation of a diffraction grating, or holographic image, into the transaction card which appears to be three-dimensional. Holographic images restrict the ability to fraudulently copy or reproduce transaction cards because of the need for extremely complex systems and apparatus for producing holograms.

Administrative and security issues, such as charges, credits, merchant settlement, fraud, reimbursements, etc., have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to communicate purchase data received from a cash register device on-line to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which could be incorporated into transaction cards. These integrated circuit (IC) cards, known as smart cards, proved to be very reliable in a variety of industries due to their advanced security and flexibility for future applications. However, even integrated circuit cards are susceptible to counterfeiting.

As magnetic stripe cards and smart cards developed, the market demanded international standards for the cards. The card's physical dimensions, features and embossing area were standardized under the International Standards Organization ("ISO"): ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch-wide stripe located either in the front or rear surface of the card and which is divided into three longitudinally parallel tracks. The first and second tracks hold read-only information with room for 79 alphanumeric characters and 40 numeric characters, respectively. The third track is reserved for financial transactions and includes enciphered versions of the user's personal identification number, country code, currency units, amount authorized per cycle, subsidiary accounts, and restrictions.

Typical transaction cards have first and second surfaces that have no textured patterns disposed therein. For example, typical transaction cards are typically made from a plurality of rigid polymeric layers, wherein outer layers are provided to provide protection to graphics and functional features of the transaction card. Moreover, printed graphics, a magnetic stripe, an integrated microchip, a holographic security feature, or other like elements, may be disposed on or in close proximity to one of the surfaces of the transaction card so as to be usable. The graphics may be viewable, and may provide information such as the type of transaction card, the name or visage of the owner of the transaction card, or other like information. Moreover, the magnetic stripe and/or integrated microchip may store information thereon to be read by a reader. In addition, security features may be provided, such as holographic imagery, to ensure that the transaction card is authentic. The protective layer of polymeric material, typically polyethylene terephthalate, is laminated thereon. The protective layer is typically very smooth and glossy.

Features that generally protrude from the surface of the transaction card, or otherwise are provided on a surface of the transaction card, may include, for example, a signature panel and embossed characters. The signature panel typically merely includes a strip of material able to be written thereon with a pen or other writing instrument. Moreover, a transaction card typically may have embossed characters produced by punching the transaction card in one surface of the transaction card such that the characters protrude from the other surface of the transaction card. Embossed characters typically provide information that may be viewable or extracted from the transaction using a transfer material and "rubbing" the embossed characters and transferring the information via the transfer material. The embossed characters do not, however, constitute a graphic pattern in at least one surface of a transaction card according to the present invention.

When handled by a user of the transaction card, no feature provides both distinctive visual and tactile properties. In other words, because transaction cards are standardized, only a small number of features distinguish one transaction card from another. In addition, since the surfaces of transaction cards are fairly smooth and glossy, maintaining a grip on the transaction cards may be difficult, such as for removing the transaction card from a wallet or a purse, or removing a transaction card from a device that can read the transaction card, such as an automatic teller machine ("ATM") or other like machine.

A need, therefore, exists for a transaction card having a textured pattern disposed in at least one surface of the transaction card thereby providing both tactile and visual properties to the transaction card. Moreover, a need exists for a transaction card having a textured pattern disposed in at least one surface of the transaction card to provide at least one surface that is more easily gripped than a typical transaction card. In addition, a need exists for a transaction card having a textured pattern thereupon for increasing security of transaction cards and decreasing the ability to counterfeit transaction cards.

In addition, a need exists for a transaction card having a textured pattern disposed in at least one surface thereof whereby the transaction card is able to be used like a traditional transaction cards. Specifically, a need exists for a transaction card that is usable in an ATM, whereby the transaction card is gripped and pulled into the ATM or, alternatively, the transaction card can be swiped in a transaction card reader, without interference from the textured pattern disposed in at least one surface of the transaction card. Moreover, a need exists for textured pattern on a transaction card that does not interfere with the proper use of the signature panel, magnetic stripe, holographic image, microchip, or other like feature.

SUMMARY

Transaction cards are provided having a plurality of layers forming a first surface and a second surface wherein at least one of said first and second surfaces comprises a textured graphic pattern disposed therein, preferably by laminating said textured graphic pattern. In addition, a method of making a transaction card is provided wherein a textured graphic pattern is disposed into a lamination plate, and further wherein a plurality of layers are laminated together to form a rigid card having the textured pattern disposed in at least one of the first and second surfaces of the transaction card via the lamination plate.

To this end, in an embodiment of the present invention, a transaction card is provided comprising: a first surface and a second surface, and a textured graphic pattern laminated in at least one of the first and second surfaces of the transaction card. The textured graphic pattern may be disposed in only the first surface. Alternatively, the textured graphic pattern is disposed in both the first surface and the second surface. In addition, the textured graphic pattern comprises a plurality of features, wherein the features may be selected from the group consisting of raised lines, blocks, dots, and mixtures thereof. Alternatively, the features are selected from the group consisting of depressed pits, valleys and mixtures thereof. Moreover, the features are selected from the group consisting of raised lines, raised block, raised dots, depressed pits, depressed valleys, and mixtures thereof. The textured graphic pattern may be disposed in the at least one of the first and second surfaces of the transaction card with a textured lamination plate.

In various embodiments, the present invention provides a transaction card comprising a first surface and a second surface and a textured pattern disposed in a substantially continuous layer over at least one of the entire first surface and the entire second surface. The transaction card may comprise a first surface and a second surface, and a textured pattern disposed on at least one of the first surface and the second surface, wherein the textured pattern comprises a logo. The logo may be a corporate trademark. The logo may also be multi-featured.

In an alternate embodiment of the present invention, a method of making a transaction card is provided comprising the step of laminating a plurality of layers together to form a rigid card comprising a first surface and a second surface wherein laminating said plurality of layers together provides a textured graphic pattern disposed in at least one of the first and second surfaces of the transaction card. The textured graphic pattern may be disposed in the at least one of the first and second surfaces with at least one textured lamination plate.

In various embodiments, the present invention provides a method of making a transaction card comprising the steps of laminating a plurality of layers together to form a transaction card sheet comprising a first surface and a second surface wherein laminating said plurality of layers together provides a textured pattern disposed in a substantially continuous layer over at least one of the entire first surface and the entire second surface, and removing individual transaction cards from the transaction card sheet.

Moreover, the method further comprises the step of laminating the plurality of layers together with a first textured lamination plate to form a textured graphic pattern in only the first surface of the transaction card. In addition, the method comprises the step of laminating the plurality of layers together with a first textured lamination plate and a second textured lamination plate to form the textured graphic pattern in both the first surface and the second surface of the transaction card.

In a still further embodiment of the present invention, a method of forming a textured transaction card comprises the steps of disposing a textured graphic pattern onto a lamination plate; laminating a plurality of thermoplastic polymeric layers together to form a rigid card using the lamination plate with the textured graphic pattern disposed thereon; and disposing the graphic pattern onto a first surface of the rigid card during lamination of the plurality of thermoplastic polymeric layers together. The method further comprises the steps of disposing a second textured graphic pattern onto a second lamination plate; and disposing the second textured graphic pattern onto a second surface of the rigid card during lamination of thermoplastic polymeric layers together. Moreover, the textured graphic pattern disposed on the first surface of the rigid card has a depth of between about 2 and 3 mils.

In various embodiments, the present invention provides a method of forming a textured lamination plate for fusing together a plurality of thermoplastic polymeric layers together to form a rigid transaction card comprising the steps of disposing a textured graphic pattern in a substantially continuous layer over an entire surface of a lamination plate, laminating a plurality of thermoplastic polymeric layers together to form a rigid sheet using the lamination plate with the textured graphic pattern disposed thereon, and disposing the graphic pattern onto a first surface of the rigid sheet during lamination of the plurality of thermoplastic polymeric layers together, wherein said graphic patterns comprises features selected from the group consisting of raised lines, raised blocks, raised dots, depressed pits, depressed valleys, and mixtures thereof.

The present invention, therefore, provides a textured graphic pattern disposed in at least one surface thereof to provide a tactile and/or visual property. Moreover, a textured graphic pattern is disposed in at least one surface thereof to provide a gripping surface for a user to more easily grip the transaction card Additional features and advantages of the present invention are described in, and will be apparent from, the detailed description of the presently preferred embodiments and from the drawings.

DETAILED DESCRIPTION

A transaction card is provided comprising at least one surface having a textured graphic pattern disposed therein. In an alternate embodiment of the present invention, both surfaces of the transaction card have the textured graphic pattern disposed therein. Moreover, a method of making a transaction card is provided for disposing a textured graphic pattern in at least one surface of the transaction card.

For purposes of the present invention, a transaction card is a rigid card made from, preferably, thermoplastic polymeric materials, typically layered together and laminated, thereby fusing the layers together to form the rigid card. Transaction cards of the present invention may be utilized to purchase goods and/or services in lieu of paper money or coinage. Typically, transaction cards are linked to a financial service provider, such as a bank or the like, whereby the bank underwrites purchases made by the transaction card in exchange for a fee or interest rate. Alternatively, a transaction card may be a debit card whereby upon processing the transaction card for a purchase of a good and/or service, an amount stored within an account at a financial institution, such as a bank, is reduced. Moreover, a transaction card may be a stored-value card, whereby a value may be stored within a memory on the transaction card or the card is linked to a financial institution, whereby purchases of goods and/or services may be made with the transaction card, and the value represented by the transaction card is subsequently reduced. Typically, value may be added to stored-value cards thereby replenishing the cards to be reusable.

Figure 1:
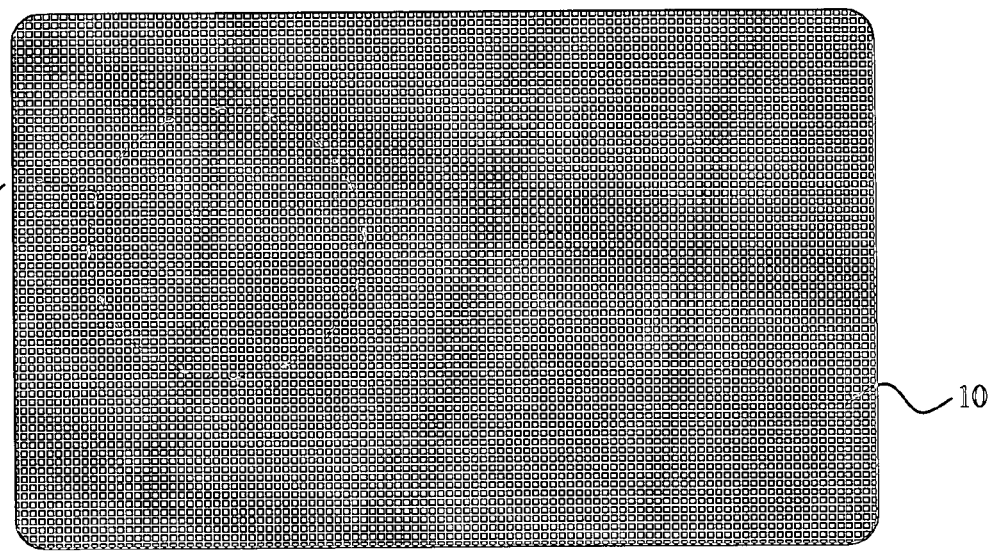
FIG. 1 illustrates a front side view of a transaction card having a textured pattern disposed in a front surface thereof in an embodiment of the present invention.
Figure 2:
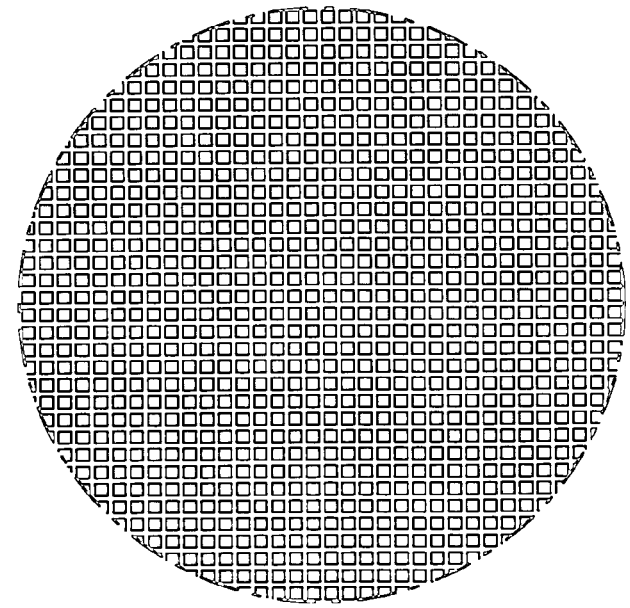
FIG. 2 illustrates a close-up view of the textured graphic pattern disposed in the front surface of the transaction card in an embodiment of the present invention.

Referring now to the figures, wherein like numerals describe like parts, FIG. 1 illustrates a front side view of a transaction card 1 having a textured graphic pattern disposed in a front surface 10 of the transaction card 1. The textured graphic pattern may be raised lines, blocks, and/or dots that may be disposed on or in close proximity to the surface of the transaction card. Alternatively, the textured graphic pattern may comprise pits and/or valleys disposed in or in close proximity to the surface of the transaction card 1. Preferably, the textured graphic pattern of the transaction card 1 comprises alternating raised lines, block and/or dots with depressed pits and/or valleys. Although the present description illustrates abstract or symmetrical patterns, any pattern may be disposed in the front surface 10 of the transaction card 1. For example, patterns may consist of pictures of objects and/or people, whereby the alternating raised lines, blocks and/or dots with the depressed pits and/or valleys may form an image on the transaction card 1. The pattern illustrated in FIG. 1 is further illustrated in a close-up view of the transaction card 1, as illustrated in FIG. 2, whereby the textured graphic pattern has a plurality of raised features in the form of squares and valleys are disposed between the plurality of raised features.

Moreover, although the present invention illustrates a textured graphic pattern in only a front surface 10 of the transaction card 1, a second textured pattern may be disposed on the back surface of the transaction card 1 (not shown). In an embodiment of the present invention, the front surface 10 may have the textured graphic pattern disposed over the entire front surface 10 of the transaction card 1. In an alternate embodiment of the present invention, the textured graphic pattern may be disposed in one or more discrete locations on the front surface 10 of the transaction card 1. Likewise, the textured graphic pattern may be disposed either across the entire back surface of the transaction card 1 or in discrete locations on the back surface of the transaction card 1.

Figure 3:
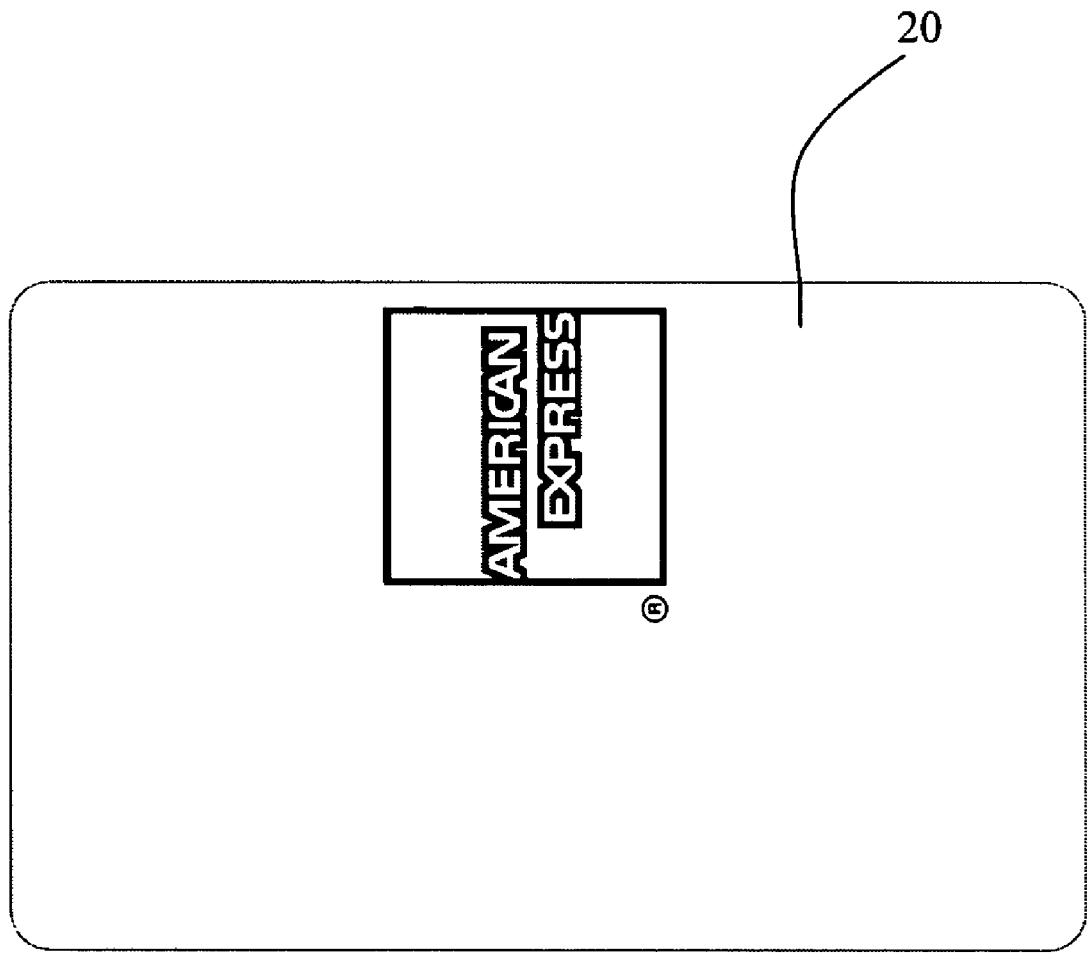
FIG. 3 illustrates a front side view of a transaction card having an alternate embodiment of a textured pattern disposed in a front surface thereof.

FIG. 3 illustrates a preferred embodiment of the present invention of a textured graphic pattern provided on a transaction card 20. As illustrated, the textured graphic pattern is the American Express corporate logo that is provided in a surface of a textured transaction card. The American Express logo consists of raised lines in the surface of the transaction card.

The textured transaction card of the present invention may have a plurality of layers that are laminated together. Specifically, the textured transaction card may include any thermoplastic material apparent to one having ordinary skill in the art to form transaction cards, such as, for example, PVC or PET or other like thermoplastic material. In addition, the textured transaction cards of the present invention may be transparent or translucent, having an infrared blocking material, such as a film, lens, ink or other infrared blocking material, as described in U.S. Pat. No. 6,581,839, which is hereby incorporated in its entirety.

Figure 4:
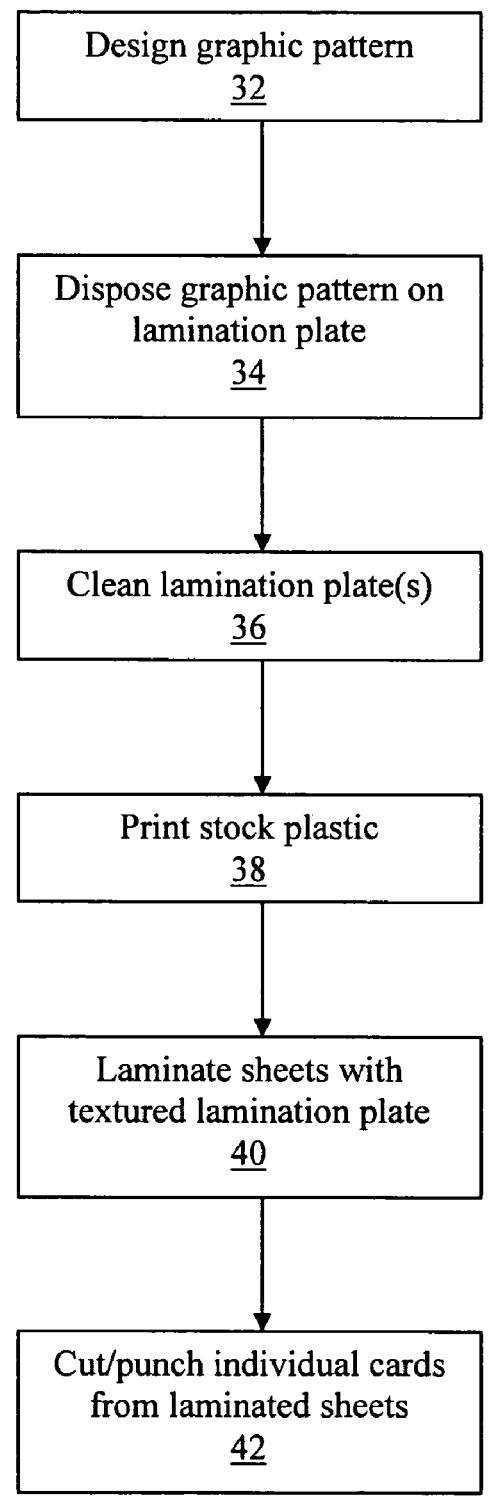
FIG. 4 illustrates a method of making transaction cards having a textured pattern disposed in a surface of the transaction card.

FIG. 4 illustrates a preferred method 30 of making the textured transaction cards of the present invention. Specifically, in a first step 32, a graphic pattern is designed. Typically, a graphic layout computer program is utilized for designing the graphic design to be disposed on at least one surface of the transaction cards. The graphic pattern is then provided to a die maker.

In a second step 34, the die maker disposes the graphic pattern onto a lamination plate. Specifically, the die maker may dispose the graphic pattern in any way apparent to one having ordinary skill in the art, such as by etching, engraving, photo-lithography, or other like methods. The lamination plate may be made from a variety of metals, such as magnesium, copper, bronze, chrome-plated metal, stainless steel, or other like metals. The depth of the graphic pattern disposed on the lamination plate is typically between about 0.002 inches and about 0.003 inches (between about 2 and 3 mils).

In a third step 36, the plates are vigorously cleaned to remove any residue from the front and the back of the lamination plate, such as oil, grease, dirt, debris, or other like residue. It is important for the lamination plate to be very clean, so that residue does not interfere with the graphic pattern transferred to a transaction card from the lamination plate. Typically, a solvent is used to remove reside from the lamination plate.

In a fourth step 38, sheets of polymeric plastic layers are printed using standard printing methods on core stock plastic, typically about 7.5 mm thick or less, although other thicknesses may be utilized. The sheets form a plurality of transaction cards that are then cut, punched, or otherwise removed from the sheet to form individual transaction cards.

In a fifth step 40, the layers of the sheet are laminated together. In a preferred embodiment, the textured lamination plate is placed against the front surface of the sheet of transaction cards. A standard lamination plate is preferably placed on the back surface of the sheet of transaction cards. The layers of the sheet of the transaction cards are laminated via a standard lamination process, whereby heat and pressure are provided to fuse the layers of the sheet of transaction cards together. The textured lamination plate transfers the graphic pattern to the front surface of the transaction card sheet. Alternatively, a textured lamination plate may be placed on the back surface of the sheet of transaction cards instead of over the front surface of the sheet of transaction cards. In an alternate embodiment, a textured lamination plate is placed on both the front surface and the back surface of the sheet of transaction cards to provide a textured graphic pattern on both the front surface and the back surface of the transaction card.

In a final step 42, individual transaction cards are then cut from, punched, or otherwise removed from the sheet. Each individual transaction card may have dimensions consistent with ISO standards, in terms of length, width and thickness. It should be noted, however, that smaller sized transaction cards are contemplated by the present invention, such as transaction cards having at least one dimension smaller than ISO standards.

EXAMPLE 1

A sheet of a plurality of transaction cards was laminated according to the steps described above in Burkle lamination equipment having one textured lamination plate and a non-textured lamination plate, to provide a textured graphic pattern on a front surface of the transaction cards.

Specifically, the textured transaction card of Example 1 is laminated as a sheet in Burkle lamination equipment in a heating cycle of about 325 degrees C. for a period of 4 minutes at a pressure of about 40 psi followed by a period of about 18 minutes at a pressure of about 120 psi having at least one textured lamination plate. The textured transaction cards of Example 1 are then subject to a first cooling cycle of about 55 degrees C. for a period of about 2 minutes at a pressure of about 80 psi. The cards are then subjected to a second cooling cycle at about 55 degrees C. for an 18 minute period at a pressure of about 210 psi. The sheet is then cooled and cut or punched to form individual transaction cards.

The present invention has been described above with reference to exemplary embodiments. However, those skilled in the art having read this disclosure will recognize that changes and modifications may be made to the exemplary embodiments without departing from the scope of the present invention.

We claim:

1. A transaction card comprising:
   a first surface and a second surface, wherein the first surface comprises an entirety of a surface of the transaction card; and
   a textured pattern disposed over the first surface, wherein the textured pattern comprises a logo,
   wherein the textured pattern is disposed in a substantially continuous layer over an entirety of the first surface,
   wherein the textured pattern is formed during a lamination process that utilizes a textured die, and
   wherein the textured pattern is tactilely perceivable, and
   wherein the lamination process comprises a heating cycle of about 325° C. for a period of about 4 minutes at a pressure of about 40 psi and a period of about 18 minutes at a pressure of about 120 psi.

2. The transaction card of claim 1, wherein the logo further comprises a corporate trademark.

3. The transaction card of claim 1, wherein the logo is multi-featured.

4. The transaction card of claim 1, wherein a second textured pattern is disposed over the second surface.

5. The transaction card of claim 4, wherein the second textured pattern comprises a logo.

6. The transaction card of claim 4, wherein the second textured pattern is disposed in a substantially continuous layer over the second surface.

7. The transaction card of claim 4, wherein the second textured pattern forms an image.

8. The transaction card of claim 1, wherein the transaction card is at least one of transparent and translucent.

9. The transaction card of claim 1, wherein the textured pattern comprises at least one of a plurality of alternating raised lines, a plurality of blocks, a plurality of dots, a plurality of depressed valleys, a plurality of depressed pits, and combinations thereof 10. The transaction card of claim 1, wherein the textured pattern has a depth of between about 2 mils and 3 mils.

11. The transaction card of claim 1, wherein the lamination process is performed prior to an embossing process.

12. The transaction card of claim 11, wherein the second surface is substantially smooth.

13. The transaction card of claim 12, wherein the transaction card further comprises a plurality of layers, wherein the textured pattern is disposed in at least one layer, but not all layers, of the plurality of layers.

14. A transaction card comprising:
    a first surface and a second surface, wherein the first surface comprises an entirety of a surface of the transaction card; and
    a textured pattern disposed in a substantially continuous layer over an entirety of the first surface,
    wherein the textured pattern is formed during a lamination process that utilizes a textured die,
    wherein the textured pattern is tactilely perceivable, and
    wherein the lamination process comprises a heating cycle of about 325° C. for a period of about 4 minutes at a pressure of about 40 psi and a period of about 18 minutes at a pressure of about 120 psi.

15. The transaction card of claim 14, wherein the textured pattern is disposed over only the first surface.

16. The transaction card of claim 14, wherein the textured pattern is uniformly disposed over the first surface.

17. The transaction card of claim 14, wherein the lamination process is performed prior to an embossing process.

18. The transaction card of claim 17, wherein the second surface is substantially smooth.

19. The transaction card of claim 18, wherein the transaction card further comprises a plurality of layers, wherein the textured pattern is disposed in at least one layer, but not all layers, of the plurality of layers.

* * * * *